(12) United States Patent  
Ohlsson et al.

(10) Patent No.: US 11,452,029 B2
(45) Date of Patent: Sep. 20, 2022

(54) BROADCAST OF FEATURES REQUIRED FOR UE ACCESSING A CELL

(71) Applicant: Telefonaktiebolaget LM Ericsson (publ), Stockholm (SE)

(72) Inventors: Oscar Ohlsson, Bromma (SE); Mattias Bergström, Sollentuna (SE); Malik Wahaj Arshad, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/973,069

(22) PCT Filed: Jun. 5, 2019

(86) PCT No.: PCT/SE2019/050526
§ 371 (c)(1),
(2) Date: Dec. 8, 2020

(87) PCT Pub. No.: WO2019/235999
PCT Pub. Date: Dec. 12, 2019

(65) Prior Publication Data
US 2021/0250846 A1   Aug. 12, 2021

Related U.S. Application Data

(60) Provisional application No. 62/682,200, filed on Jun. 8, 2018.

(51) Int. Cl.
*H04W 48/10* (2009.01)
*H04W 48/02* (2009.01)
*H04W 48/16* (2009.01)

(52) U.S. Cl.
CPC .......... *H04W 48/10* (2013.01); *H04W 48/02* (2013.01); *H04W 48/16* (2013.01)

(58) Field of Classification Search
None
See application file for complete search history.

(56) References Cited

U.S. PATENT DOCUMENTS

2019/0342819 A1* 11/2019 Kadiri .................. H04L 5/0091

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.1 0, Mar. 2018, 1-71.

(Continued)

*Primary Examiner* — Hong S Cho
(74) *Attorney, Agent, or Firm* — Murphy, Bilak & Homiller, PLLC

(57) ABSTRACT

A method performed by a wireless device (130). The method is for handling access to a cell (120) served by a network node (110). The wireless device (130) and the network node (110) operate in a wireless communications network (100). The wireless device (130) obtains (201) a set of indications broadcasted by the network node (110) in the cell (120). The set of indications indicate that access to the cell (120) is allowed only to wireless devices simultaneously supporting at least two features of a plurality of features comprising a first feature and a second feature. The wireless device (130) then determines (202) whether or not access to the cell (120) is barred to the wireless device (130) based on the obtained set of indications.

18 Claims, 9 Drawing Sheets

(56) References Cited

OTHER PUBLICATIONS

Ericsson, "Barring legacy UEs from 5GC only cells", 3GPP TSG-RAN WG2 #100, Tdoc R2-1713270 (revision of R2-1710188), Reno, Nevada, USA, Nov. 27-Dec. 1, 2017, 1-4.
3GPP, "3rd Generation Partnership Project; Technical Specification Group Services and System Aspects; Service requirements for the 5G system; Stage 1 (Release 16)", 3GPP TS 22 261 V16.3.0, Mar. 2018, 1-54.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0, Mar. 2018, 1-786.
Wi Rapporteur (Ericsson), "Agreement summary for Rel-15 Even further enhanced MTC for LTE", 3GPP TSG-RAN WG1 Meeting #93, R1-1807971, Busan, Korea, May 21-15, 2018, 1-44.

* cited by examiner

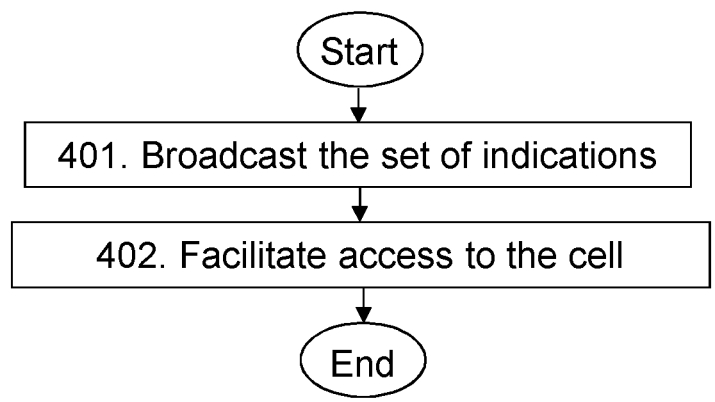
Figure 4
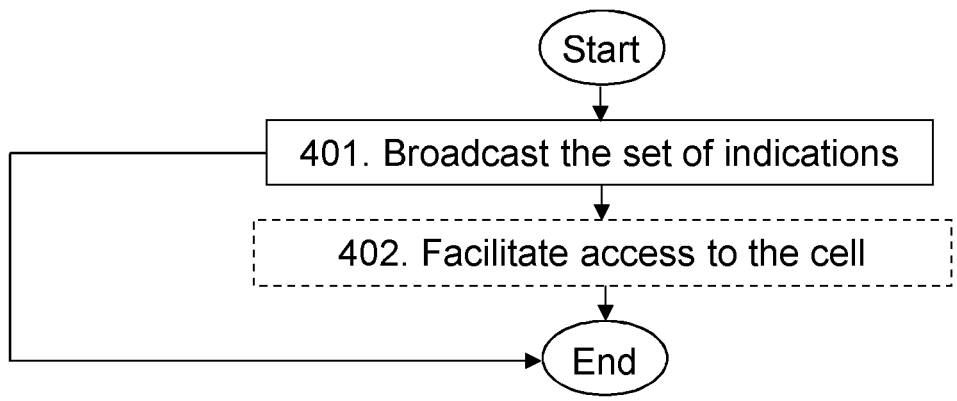
Figure 4bis a)

b)

a)

b)

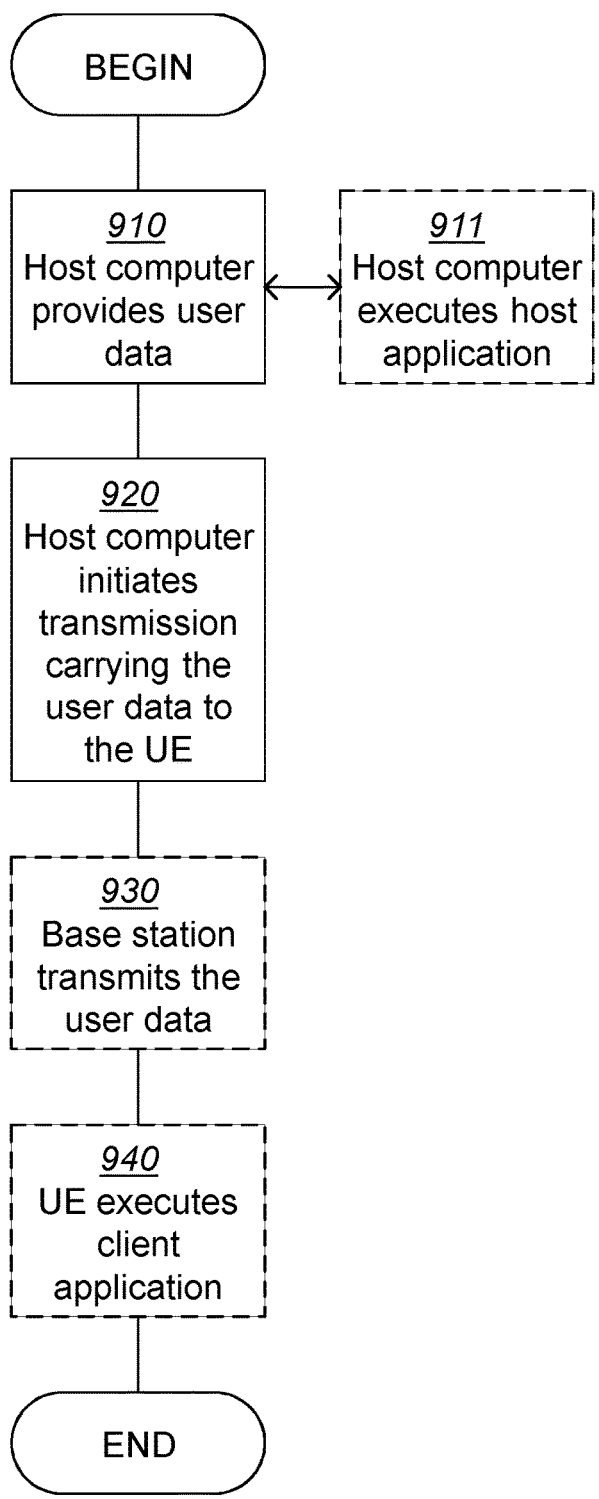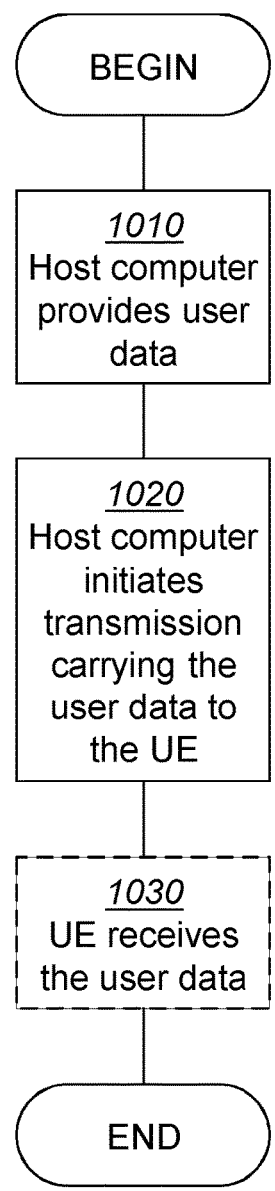
FIG. 9
FIG. 10

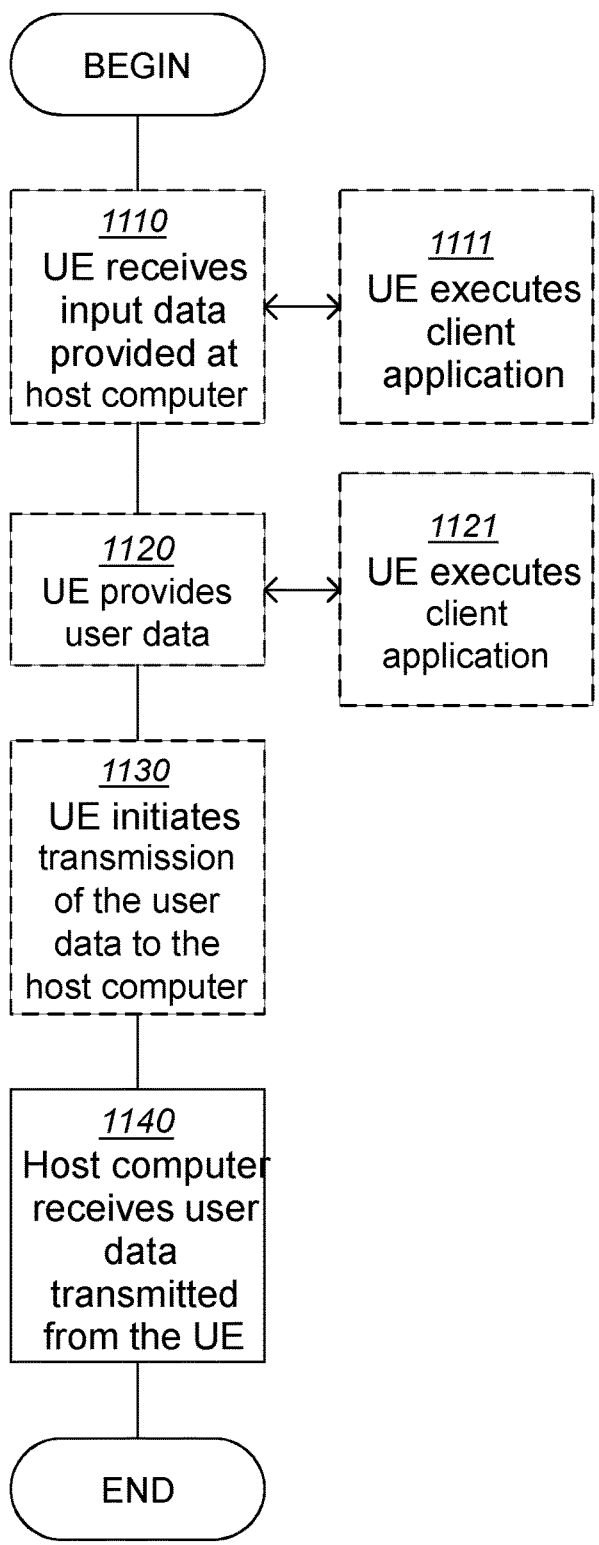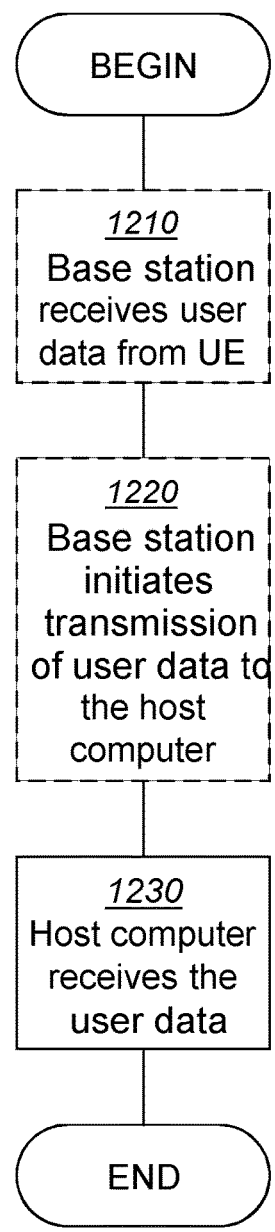
FIG. 11
FIG. 12

BROADCAST OF FEATURES REQUIRED FOR UE ACCESSING A CELL

TECHNICAL FIELD

The present disclosure relates generally to a wireless device, and methods performed thereby, for handling access to a cell. The present disclosure also relates generally to a network node, and methods performed thereby, for handling access to a cell. The present disclosure further relates generally to computer programs and computer-readable storage mediums, having stored thereon the computer programs to carry out these methods.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio (NR) Interface called NR or 5G-UTRA, as well as a Fifth Generation (5G) Packet Core Network, which may be referred to as Next Generation (NG) Core Network, abbreviated as NG-CN, NGC, 5G CN or 5GC.

3GPP release 15 of LTE introduces a wide range of enhancements in LTE in many different areas. Two of the introduced features are LTE connected to 5G core network (5GC) and CRS muting.

LTE Connected to 5GC

In LTE connected to 5GC, the LTE base stations, that is, the eNBs, may be connected to the new 5GC, which may be understood to be part of new the 5G system (5GS). This may be understood to allow LTE users to take advantage of the new features offered by 5GC, such as support for network slicing, improved Quality of Service (QoS), and the new latency and battery efficient UE state called inactive mode. LTE connected to 5GC may also enable faster mobility between LTE and NR cells, that is, cells belonging to an NR base station, which are called gNBs, and which may use the new 5G radio access technology.

Since operators have invested significantly in their existing networks and may need to continue to support legacy UEs, they may likely maintain their legacy 4G core network, that is, the Evolved Packet Core (EPC), and deploy the 5G core network (5GC) in parallel. Thus, at least in the beginning, eNBs may be expected to be connected to both EPC and 5GC and serve both legacy and new UEs. In the future however, it is possible that eNBs will connect only to 5GC.

In the case when a cell is connected only to 5GC, legacy UEs will be prevented from camping on the cell by setting the cellBarred flag broadcasted in System Information Block 1 (SIB1) to the value barred. By letting the 5GC capable UEs ignore this flag, only the 5GC capable UEs may be allowed to camp on the cell. Since there may be scenarios where it may be needed to bar also the 5GC capable UEs, a new barring flag was introduced for this set of UEs called cellBarred-5GC. This means that to completely bar the cell in case of e.g., a network problem, both the cellBarred and cellBarred-5GC may need to be set to the value barred.

CRS Muting

CRS muting may be understood as a feature to reduce inter-cell interference by only transmitting the Cell Specific Reference Signal (CRS) in the central 6 or 24 Physical Resource Blocks (PRBs) rather than across the entire cell bandwidth, which is the way it may be done in legacy LTE. Since legacy UEs may expect that CRS is transmitted on all PRBs, enabling CRS muting impacts the ability of these UEs to e.g., synchronize to the cell and decode downlink data, as these operations make use of CRS. To avoid this problem, legacy UEs may be barred from camping on cells with CRS muting enabled by setting the cellBarred flag in System Information Block 1 (SIB1) to the value barred, that is, similar to what may be done in LTE connected to 5GC when the cell is 5GC only. In the same way as in LTE connected to 5GC, the existing cellBarred flag may be ignored by UE supporting CRS muting and a new cell barring flag, cellBarred-CRS, may be introduced to be able to bar this set of UEs.

Barring

In LTE, it may be wanted that a UE is required not to connect to the network, or even be considering the cell when it is in IDLE-mode selecting a cell to be "camping" on. Camping on a cell may be understood as that the UE is considering this cell as currently the best cell and it is that cell which the UE may connect to in case the UE needs to establish a connection to the network, e.g., due to data arrival. For this purpose, the concept of barring may be used, in which the UE may be prohibited from camping or connecting to a cell which is barred. In the current LTE specification, a cell may indicate in system information whether a cell is considered barred or not using for example the flag cellBarred. In addition to this flag, two more flags have been added for barring of particular UEs, namely the flags cellBarred-5GC and cellBarred-CRS which may bar 5GC-capable UEs and CRS-muting capable UEs, respectively.

Another means to bar UEs is for the network to indicate that a cell is reserved for operator use, which may be indicated by a flag with the same name, namely, cellReservedForOperatorUse. This flag is similar to, but differs from, the cellBarred flags. The UE may still camp on and connect to a cell which is reserved for operator use, if the UE is of a certain type, namely a type which only the operator, and perhaps its partners, of the network has access to. In addition to the normal cellReservedForOperatorUse-flag there are two specific versions of this flag which may be associated with the LTE connected to 5GC and CRS muting features, and which may have the preliminary names: cellReservedForOperatorUse-5GC and cellReservedForOperatorUse-CRS.

Despite the existence of the flags just described, existing methods for handling cell access may result in UEs attempting to gain access to cells with features they do not support, which may lead to wasted radio, processing and energy resources, and thereby decreased capacity and/or increased latency in the network.

SUMMARY

It is an object of embodiments herein to improve the handling of cell access in a wireless communications network.

According to a first aspect of embodiments herein, the object is achieved by a method performed by a wireless device. The method is for handling access to a cell served by a network node. The wireless device and the network node operate in a wireless communications network. The wireless device obtains a set of indications broadcasted by the network node in the cell. The set of indications indicate that access to the cell is allowed only to wireless devices simultaneously supporting at least two features of a plurality of features. The plurality of features comprises a first feature and a second feature. The wireless device also determines whether or not access to the cell is barred to the wireless device based on the obtained set of indications.

According to a second aspect of embodiments herein, the object is achieved by a method performed by a network node. The method is for handling access to the cell served by the network node. The network node operates in the wireless communications network. The network node broadcasts, to at least the wireless device in the cell, the set of indications. The set of indications indicates that access to the cell is allowed only to wireless devices simultaneously supporting at least two features of the plurality of features comprising the first feature and the second feature.

According to a third aspect of embodiments herein, the object is achieved by the wireless device. The wireless device may be considered to be for handling access to the cell served by the network node. The wireless device and the network node are configured to operate in the wireless communications network. The first wireless device is further configured to obtain the set of indications broadcasted by the network node in the cell. The set of indications is configured to indicate that access to the cell is allowed only to wireless devices simultaneously supporting at least two features of the plurality of features comprising the first feature and the second feature. The wireless device is also configured to determine whether or not access to the cell is barred to the wireless device based on the obtained set of indications.

According to a fourth aspect of embodiments herein, the object is achieved by the network node. The network node may be considered to be for handling access to the cell served by the network node. The network node is configured to operate in the wireless communications network. The network node is further configured to broadcast, to at least the wireless device in the cell, the set of indications. The set of indications is configured to indicate that access to the cell is allowed only to wireless devices simultaneously supporting at least two features of the plurality of features comprising the first feature and the second feature. The network node is also configured to facilitate access to the cell based on the broadcasted set of indications.

By the wireless device obtaining the set of indications from the network node, the wireless device is enabled to determine whether or not access to the cell is barred to the wireless device. Particularly, the wireless device may be enabled to determine if access to the cell is allowed only to wireless devices simultaneously supporting at least two features of a plurality of features comprising the first feature and the second feature. This makes it possible to support a deployment option where a cell enables the at least two features simultaneously, and it may be desirable to bar access to wireless devices that do not support the at least two features simultaneously. This may prevent wireless devices to attempt to access a cell barred to them, and therefore enables them to save resources, such as energy resources, radio resources and processing resources. Likewise, the network node may be enabled to avoid wasting energy resources, radio resources and processing resources in handling access attempts from wireless devices that are barred.

BRIEF DESCRIPTION OF THE DRAWINGS

Examples of embodiments herein are described in more detail with reference to the accompanying drawings, and according to the following description.

FIG. 4 is a flowchart depicting a method in a network node, according to embodiments herein.

FIG. 4b is a flowchart depicting a method in a network node, according to examples related to embodiments herein.

FIG. 9 is a flowchart depicting embodiments of a method in a communications system including a host computer, a base station and a user equipment, according to embodiments herein.

FIG. 10 is a flowchart depicting embodiments of a method in a communications system including a host computer, a base station and a user equipment, according to embodiments herein.

FIG. 11 is a flowchart depicting embodiments of a method in a communications system including a host computer, a base station and a user equipment, according to embodiments herein.

FIG. 12 is a flowchart depicting embodiments of a method in a communications system including a host computer, a base station and a user equipment, according to embodiments herein.

DETAILED DESCRIPTION

As part of the development of embodiments herein, one or more problems with the existing technology will first be identified and discussed.

LTE connected to 5GC and CRS muting are orthogonal features which may be enabled and disabled independently, that is, either both may be enabled, both disabled, or one of them may be enabled while the other is disabled. With the current cell barring flags, cellBarred, cellBarred-5GC, and cellBarred-CRS, it is not possible to support the case when the cell is connected to 5GC only and supports CRS muting. In this case, it may be desired to only admit UEs supporting both 5GC and CRS muting into the cell, but no matter how the barring flags are set, there will either be other UEs admitted to the cell or some of the UEs that should be admitted will be barred. For example, if the cellBarred flag is set to the value barred, UEs supporting CRS muting but not 5GC will also consider the cell as campable.

Certain aspects of the present disclosure and their embodiments may provide solutions to this challenge or other challenges. There are, proposed herein, various embodiments which address one or more of the issues disclosed herein.

Embodiments herein may be understood to address this problem in existing methods by providing methods to ensure that a UE only camps on cells where the UE supports all the features required by the cell. Two such features may be LTE connected to 5GC and CRS muting. Accordingly, embodiments herein may be understood to be related to cell barring for LTE.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
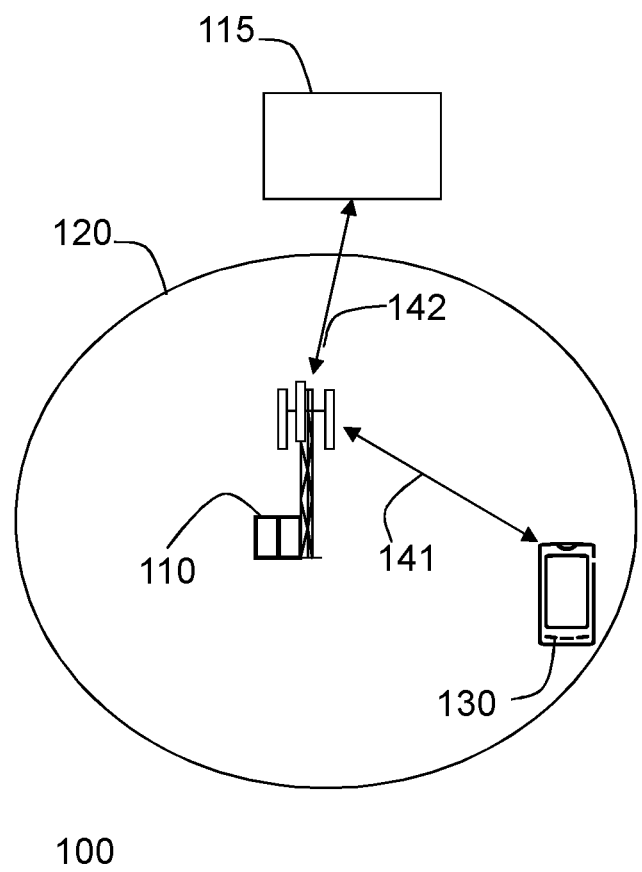
FIG. 1 is a schematic diagram illustrating a wireless communications network, according to embodiments herein.

FIG. 1 depicts a non-limiting example of a wireless communications network 100, sometimes also referred to as a wireless communications system, cellular radio system, or cellular network, in which embodiments herein may be implemented. The wireless communications network 100 may typically be a Long-Term Evolution (LTE) system, LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band. The wireless communications network 100 may support other technologies such as, particularly, a 5G system, 5G network, NR-U or Next Gen System or network. In typical examples, the wireless communications network 100 may be an LTE network connected to a core network of a 5G network (5GC). The wireless communications network 100 may alternatively support a younger system than a 5G system. The wireless communications network 100 may support other technologies such as, for example, Licensed Assisted Access (LAA), Narrow Band Internet of Things (NB-IoT), MulteFire, Wideband Code Division Multiplexing Access (VVCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (VViMax), or any cellular network or system. Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of network nodes, whereof a network node 110 is depicted in the non-limiting example of FIG. 1. The network node 110 may be a radio network node, such as a radio base station, or any other network node with similar features capable of serving a wireless device, such as a user equipment or a machine type communication device, in the wireless communications network 100. The network node 110 may be a radio base station operating on LTE, such as an eNB, a Home Node B, an Home eNode B, or a transmission point operating on NR, for example a New Radio (NR) NodeB (gNB). The wireless communications network 100 covers a geographical area which may be divided into cell areas, wherein each cell area may be served by a network node, although, one radio network node may serve one or several cells. The wireless communications network 100 comprises at least a cell 120. In the non-limiting example depicted in FIG. 1, the network node 110 serves the cell 120. The network node 110 may be of different classes, such as, e.g., macro base station (BS), home BS or pico BS, based on transmission power and thereby also cell size. The network node 110 may be directly connected to one or more core networks 115, e.g., a 5GC network, which may in turn comprise a plurality of network nodes. The one or more core networks 115 are depicted in FIG. 1 as a single box to simplify the Figure. In some examples, the network node 110 may be a distributed node, such as a virtual node in the cloud, and it may perform its functions partially, on the cloud.

A plurality of wireless devices are located in the wireless communication network 100, whereof a wireless device 130, which may also be referred to as a device or as a first wireless device, is depicted in the non-limiting example of FIG. 1. The wireless device 130, e.g., a UE, may be a wireless communication device which may also be known as e.g., a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks 115, which may be comprised within the wireless communications network 100.

The wireless device 130 may be configured to communicate in the wireless communications network 100 with the network node 110 over a first link 141, e.g., a radio link, although communication over more links may be possible. The network node 110 may be configured to communicate in the wireless communications network 100 with the one or more core networks 115 over a second link 142, e.g., a wired and/or a radio link, although communication over more wired and/or radio links may be possible.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", "sixth", and/or "seventh" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a UE, and a network node, such as the network node 110, e.g., an eNB.

In the following description, any reference to a/the UE may be understood to equally refer the wireless device 130. Any reference to a/the UEs may be understood to equally refer wireless devices. Any reference to a/the eNB may be understood to equally refer the network node 110. Any reference to a/the cell may be understood to equally refer the cell 120.

Figure 2:
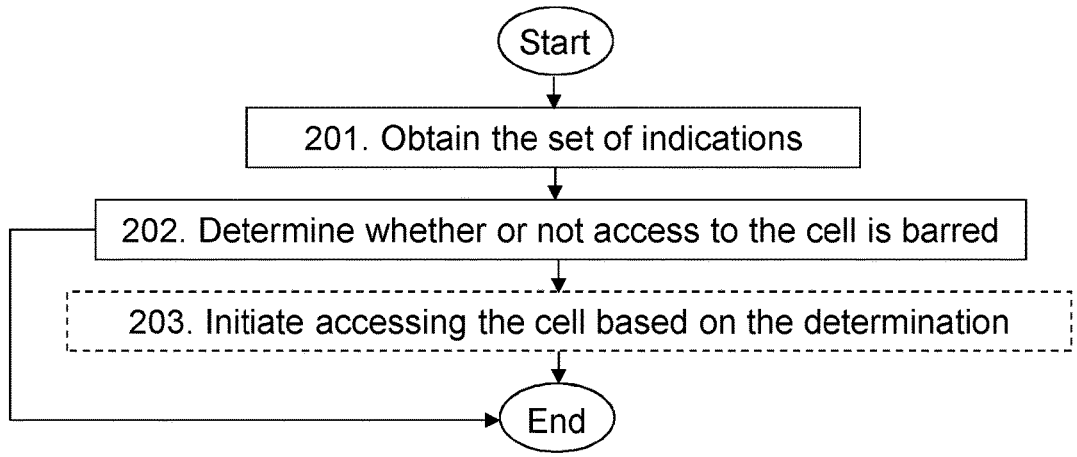
FIG. 2 is a flowchart depicting a method in a wireless device, according to embodiments herein.

Embodiments of a method, performed by the wireless device 130, will now be described with reference to the flowchart depicted in FIG. 2. The method may be understood to be for handling access to the cell 120 served by the network node 110. The wireless device 130 and the network node 110 operate in the wireless communications network 100.

Several embodiments are comprised herein. In some embodiments all the actions may be performed. In some embodiments, one or more actions may be performed. One or more embodiments may be combined, where applicable. All possible combinations are not described to simplify the description. In FIG. 2, optional actions are indicated with dashed lines. Some actions may be performed in a different order than that shown in FIG. 2. It should be noted that the examples herein are not mutually exclusive. Components from one embodiment may be tacitly assumed to be present in another embodiment and it will be obvious to a person skilled in the art how those components may be used in the other exemplary embodiments.

Action 201

As stated earlier, embodiments herein may be understood to be drawn to ensuring that the wireless device 130 only camps on cells, e.g., the cell 120, where the wireless device 130 supports all the features required by the cell 120. Accordingly, embodiments herein may be understood to be related to cell barring for LTE.

A feature as used herein may therefore be understood as a separate piece of functionality in the wireless device 130, which may provide a benefit to the wireless device 130 or the network node 110. A feature may be understood herein as an optional functionality within the wireless device 130 whose support may be typically signalled from the wireless device 130 to the network node 110 via a capability parameter. Hence, a feature may be understood as a characteristic or functionality of a wireless device that may be signalled by the wireless device 130. Two such features may be, e.g., LTE connected to 5GC and CRS muting. A feature as used herein may therefore be understood to not refer to mandatory features, that is, basic characteristics, such as the support of an antenna etc., which may be understood to be supported by all wireless devices, and, for example, may not require any capability signalling. In some cases, wireless devices may not be able to access or camp on a cell, the cell 120, unless they support a certain feature, such as CRS muting and LTE connected to 5GC.

In this Action 201, the wireless device 130 obtains a set of indications broadcasted by the network node 110 in the cell 120. The set of indications indicate that access to the cell 120 is allowed only to wireless devices simultaneously supporting at least two features of a plurality of features. The plurality of features comprises a first feature and a second feature.

It should be noted that 5GC and CRS muting will herein be used as examples of the first feature and the second feature, respectively. However, it may be understood that embodiments herein may be applied to any type of features for which one may want to block supporting/non-supporting UEs. In addition, in order to simplify the readability of the description of embodiments herein, only two features are considered here, 5GC and CRS muting. However, embodiments herein may be generalized such that they may apply for any number of features.

The obtaining may be understood herein as e.g., receiving. The obtaining in this Action 201 may be performed via, e.g., the first link 141.

Broadcasted may be understood as e.g., sent.

The indications may be explicit or implicit. The indications may be direct, or may be derived, from the set of indications. An indication may be e.g., a flag.

Simultaneously may be understood as meaning at the same time.

There may be different ways for the set of indications to indicate that access to the cell 120 is allowed only to wireless devices simultaneously supporting the at least two features. These different ways may be understood to be as different approaches, that may be designed, for example, in consideration of the already existing indications in the cell 120. These different ways may then be understood to fill the void that exists in existing methods, to enable to indicate whether or not access to the cell 120 is allowed only to wireless devices simultaneously supporting at least two features.

According to these different ways, the set of indications may comprise at least one of the following indications.

In some embodiments, the set of indications may comprise a first indication, e.g., a flag, indicating whether or not access is barred explicitly to wireless devices supporting, simultaneously, at least the first feature and the second feature. The first indication may be understood as a new flag that may be used in combination with other existing flags to indicate whether or not access to the cell 120 is allowed only to wireless devices simultaneously supporting the at least two features.

In some examples, the set of indications may comprise a second indication, e.g., another flag, indicating whether or not access is barred only explicitly to wireless devices lacking support to the first feature and a third indication indicating access is barred only explicitly to wireless devices lacking support to the second feature. The second indication may be understood as another new flag that may be used in combination with other existing flags to indicate whether or not access to the cell 120 is allowed only to wireless devices simultaneously supporting the at least two features.

In some examples, the set of indications may comprise two or more fourth indications, e.g., other flags, explicitly indicating features enabled in the cell 120. The one or more fourth indications may be understood to be indirect indicators of whether the first feature and the second feature are supported or not. From these two or more fourth indications, the wireless device 130 may then be enabled to derive if the first feature and the second feature are supported or not in the cell 120.

These different options will now be explained with some illustrative examples.

EXAMPLES

In some examples, the first feature may be Fifth Generation Core network (5GC) connectivity. The second feature may be Cell Specific Reference Signal (CRS) muting. In some particular embodiments, the first feature may be Fifth Generation Core network (5GC) connectivity, and the second feature may be Cell Specific Reference Signal (CRS) muting.

To assist in the understanding of the methods described herein using 5GC and/or CRS muting as an illustrative example, reference will be made to the Venn diagram in FIG. 3, which shows the different sets of UEs depending on their support for 5GC and/or CRS muting. The largest oval encompasses all UEs (A group). In turn, the A group encompasses the second largest oval, which comprises all rel-15 UEs and post rel-15 UEs (A' group). The A' group comprises two further subsets of UEs: the B group, comprising UEs supporting the first feature, e.g., 5GC, and the C group, comprising UEs supporting the second feature, e.g., CRS muting. Some UEs may support both of the first feature and the second feature simultaneously. These UEs may found in the intersection of the B group and the C group, namely, B∩c.

Figure 3:
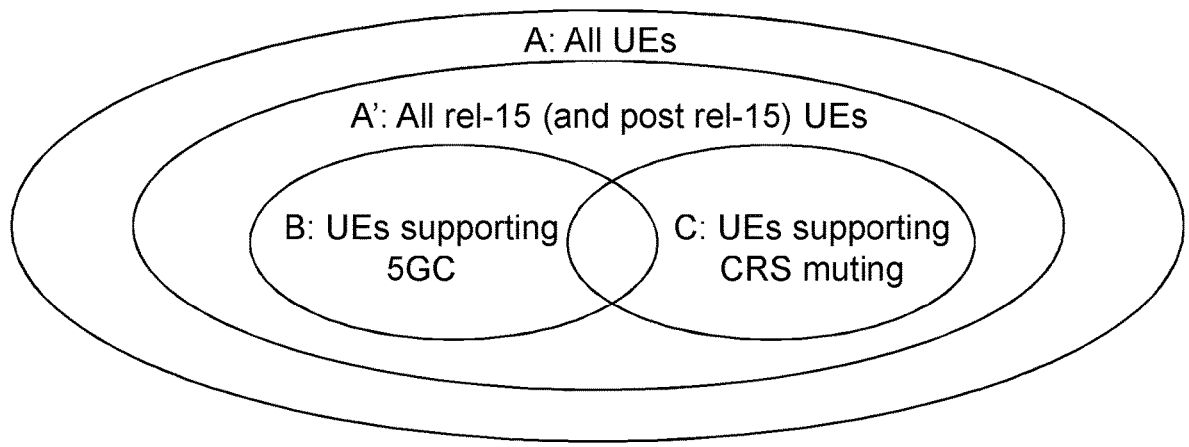
FIG. 3 is a schematic diagram illustrating a Venn diagram, according to embodiments herein.

The relation between the current, or existing, barring flags and the sets in FIG. 3 is as follows:

| | |
|---|---|
| cellBarred | blocks all UEs except those supporting 5GC or CRS muting, that is, the UEs in A/(B∪C) |
| cellBarred-5GC | blocks all UEs supporting 5GC, that is, the wireless devices in B |
| cellBarred-CRS | blocks all UEs supporting CRS muting, that is, the UEs in C |

Some examples of embodiments herein may aim to achieve to only admit the UEs supporting both 5GC and CRS muting into the cell 120, that is, the UEs in B∩c. Or formulated in the other way around, embodiments herein may aim to bar all UEs not supporting either 5GC or CRS muting. In the following, different groups of examples are described for achieving this. In the following, the term rel-15 UE is used to refer to a UE of 3GPP rel-15 or of a later 3GPP release, unless explicitly stated otherwise.

Some embodiments herein will now be further described with some non-limiting examples, which are divided in three groups.

1) Group of Examples 1

In the first group of examples, embodiments herein may be understood to be related to introducing the first indication as a new barring flag for UEs supporting both 5GC and CRS muting.

In the first group of examples, a UE in B∩c may ignore the current cell barring flags and a new cell barring flag, highlighted in bold font, may be introduced for this set of UEs, that may be called cellBarred-5GC-CRS. Thus, there may be four cell barring flags, each corresponding to a disjoint set of UEs:

| | |
|---|---|
| cellBarred | blocks all UEs except those supporting 5GC or CRS muting, that is, the UEs in A/(B∪C); |
| cellBarred-5GC | blocks all UEs supporting 5GC except those also supporting CRS muting, that is, the UEs in B/C; |
| cellBarred-CRS | blocks all UEs supporting CRS muting except those also supporting 5GC, that is, the UEs in C/B; and |
| cellBarred-5GC-CRS | blocks all UEs supporting both 5GC and CRS muting, that is, the UEs in B∩C. |

To only admit the UEs in B∩c into the cell 120, the first three barring flags cellBarred, cellBarred-5GC, and cell- Barred-CRS may be set to the value barred. It may be noted that the fourth barring flag cellBarred-5GC-CRS, e.g., the first indication, may be used to bar the UEs in B∩c and may be needed if it may be desired to bar the entire cell 120. In this case, all four barring flags may be set to value barred.

According to the foregoing, in the first group of examples, the first indication may be a cellBarred-5GC-CRS flag. It should also be noted that the cellBarred-flags will be used herein as example. However, it may be understood that embodiments herein may be applied also to the flags of the type cellReservedForOperatorUse.

2) Group of Examples 2

In the second group of examples, embodiments herein may be understood to be related to introducing the second indication and the third indication as new barring flags for UEs not supporting 5GC and CRS muting.

In this group of examples, two new barring flags may be introduced for rel-15 UEs not supporting 5GC and CRS muting, called cellBarred-non-5GC and cellBarred-non-CRS, respectively. Unlike in the previous group of examples, the interpretation of any of the existing barring flags may not need to be changed. In total, then there may be five barring flags, where the new flags are highlighted in bold:

| | |
|---|---|
| cellBarred | blocks all UEs except those supporting 5GC or CRS muting, that is, the UEs in A/(B∪C; |
| cellBarred-5GC | blocks all UEs supporting 5GC, that is, the UEs in B; |
| cellBarred-CRS | blocks all UEs supporting CRS muting, that is, the UEs in C; |
| cellBarred-non-5GC | blocks all rel-15 UEs not supporting 5GC, that is, the UEs in A'/B; and |
| cellBarred-non-CRS | blocks all rel-15 UEs not supporting CRS muting, that is, the UEs in A'/C. |

It may be noted that any new system information introduced in rel-15 may only be understood/read/parsed by rel-15 UEs. Hence, the flags cellBarred-non-5GC and cellBarred-non-CRS may only be able to bar UEs from the set A'.

To only admit the UEs in B∩c into the cell 120, the barring flags cellBarred, cellBarred-non-5GC, and cellBarred-non-CRS may be set to the value barred. If it is desired to bar the entire cell 120, the barring flags cellBarred, cellBarred-5GC, and cellBarred-CRS may be set to the value barred.

According to the foregoing, in some embodiments, the second indication may be a cellBarred-non-5GC flag and the third indication may be a cellBarred-non-CRS flag.

3) Group of Examples 3

In the first group of examples, embodiments herein may be understood to be related to rel-15 UEs, as the wireless device 130 in some examples, checking if it supports the features that the cell 120 has enabled, by checking the one or more fourth indications.

In this group of examples, the interpretation of the existing barring flags may not need to be changed, nor there may be a need for any additional barring flags to be introduced. Instead, the wireless device 130 may receive indirect indications for other features from which it may be enabled to derive whether or not access to the cell 120 is barred. This will be explained for this group in the next Action 202. In the third group of examples, the two or more fourth indications may comprise: a) a Public Land Mobile Network (PLMN) identifier (ID) in an Evolved Packet Core (EPC), PLMN list indicating whether or not the first feature is enabled; and b) an nw-BasedCRS-/nterferenceMitigation flag indicating whether or not the second feature is enabled.

By the wireless device 130 obtaining the set of indications from the network node 110, the wireless device 130 is enabled to determine whether or not access to the cell 120 is barred to the wireless device 130. Particularly, the wireless device 130 may be enabled to determine if access to the cell 120 is allowed only to wireless devices simultaneously supporting at least two features of a plurality of features comprising the first feature and the second feature. This makes it possible to support a deployment option where a cell enables the at least two features simultaneously, and it may be desirable to bar access to wireless devices that do not support the at least two features simultaneously. This may prevent wireless devices to attempt to access a cell barred to them, and therefore enables them to save resources, such as energy resources, radio resources and processing resources.

Action 202

In this Action 202, the wireless device 130 determines whether or not access to the cell 120 is barred to the wireless device 130 based on the obtained set of indications.

Determining may be understood as checking, calculating, deriving, etc.

The way in which the wireless device 130 may determine whether or not access to the cell 120 is barred may depend on the indications comprised in the set of indications. There may be other indications, e.g., barring flags, than the first indication, the second indication and the one or more fourth indications, and the wireless device 130 may determine whether or not access to the cell 120 is barred by taking into account these other indications, as will now be explained using the groups of examples described earlier.

1) Group of Examples 1

In this group of examples there may be other indications, e.g., barring flags, such as cellBarred, cellBarred-5GC and cellBarred-CRS.

In some examples in the first group of examples, the determining may be further based on a fifth indication, a sixth indication and a seventh indication. The fifth indication may indicate that access is barred to all wireless devices, except those supporting the first feature or the second feature. In some examples, the fifth indication may be, e.g., a cellBarred flag. The sixth indication may indicate that access is barred to all wireless devices supporting the first feature, except those also supporting, simultaneously the second feature. In some examples, the sixth indication may be, e.g., a cellBarred-5GC flag. The seventh indication may indicate that access is barred to all wireless devices supporting the second feature, except those also supporting, simultaneously the first feature. In some examples, the seventh indication may be, e.g., a cellBarred-CRS flag.

In some embodiments, the set of indications may comprise the first indication indicating whether or not access is barred explicitly to wireless devices supporting, simultaneously, the first feature and the second feature, wherein the first feature is 5GC connectivity, and the second feature is CRS muting, wherein the first indication is a cellBarred-5GC-CRS flag, wherein the fifth indication is a cellBarred flag, wherein the sixth indication is a cellBarred-5GC flag, and wherein the seventh indication is a cellBarred-CRS flag.

2) Group of Examples 2

In this group of examples there may be also be other indications, e.g., barring flags, such as cellBarred, cellBarred-5GC and cellBarred-CRS.

In the second group of examples, the second indication may be a cellBarred-non-5GC flag and the third indication may be a cellBarred-non-CRS flag. In this group of examples, the wireless device 130 may check if the cellBarred-non-5GC or cellBarred-non-CRS is set.

In some examples in the second group of examples, the determining in Action 202 may be further based on: the fifth indication indicating that access is barred to all wireless devices except those supporting, the first feature or the second feature.

3) Group of Examples 3

In this group of examples, instead of changing the interpretation of the existing barring flags or introducing any additional barring flags, the wireless device 130, as a rel-15 UE in this example, that is, UEs in A', may check, in this Action 202, if it supports all the features that the cell 120 may have enabled. Otherwise it may treat the cell 120 as barred. This may be understood to mean that, for example, if the wireless device 130 as a rel-15 UE, does not support CRS muting and the cell 120 has CRS muting enabled, or the wireless device 130 as a rel-15 UE does not support 5GC, and the cell 120 is only connected to 5GC, the cell 120 may be considered as barred by the wireless device 130 and it may continue searching for another cell to camp on.

To determine if a feature is enabled or not, the wireless device 130 may check, in this Action 202, if certain feature specific information is present in the broadcasted system information. For example, to determine if CRS is enabled, the wireless device 130 may e.g., check, according to this Action 202, if the flag nw-BasedCRS-InterferenceMitigation, as one of the one or more fourth indications, is set in SIB1. As another example, to determine if the cell 120 is connected only to 5GC, the wireless device 130 may e.g. check, according to this Action 202, if the EPC PLMN list, as another of the one or more fourth indications, in SIB1 contains a valid PLMN ID. If the cell 120 is connected only to 5GC, the EPC list may contain a dummy PLMN ID value and provided this dummy PLMN value is standardized/predefined, the wireless device 130 may be able to determine that the cell 120 is 5GC only. Instead of looking at the EPC PLMN ID to determine that the cell 120 is 5GC only, it may also be possible to look, according to this Action 202, at the EPC Tracking Area Code (TAC), as yet another of the one or more fourth indications, broadcasted in SIB1. It is possible that the TAC for EPC may be different from the 5GC TAC and in case the cell 120 is 5GC only, the EPC TAC may be missing or contain a dummy value.

To only admit UEs in B∩c into the cell 120, the eNB may set the cellBarred flag in SIB1 to the value barred. Rel-15 UEs not supporting either 5GC or CRS muting may not camp on the cell 120, since they may detect that the cell 120 is only connected to 5GC and/or that CRS is enabled for the cell 120. If barring the entire cell 120 is desired, the cellBarred, cellBarred-5GC and cellBarred-CRS flags may be set to the value barred just as before.

It may be noted that the group of examples 3 is similar to the group of examples 2, except that the wireless device 130 may check if the feature is enabled rather than introducing a new barring flag for the feature. That is, instead of checking if the cellBarred-non-5GC or cellBarred-non-CRS is set, the wireless device 130 may check if the cell 120 is connected only to 5GC or has CRS muting enabled.

By the wireless device 130 determining whether or not access to the cell 120 is barred to the wireless device 130 based on the obtained set of indications, the wireless device 130 may be enabled to determine if access to the cell 120 is allowed only to wireless devices simultaneously supporting at least two features of a plurality of features comprising the first feature and the second feature. This makes it possible to support a deployment option where the cell 120 enables the at least two features simultaneously, and it may be desirable to bar access to wireless devices that do not support the at least two features simultaneously. This may prevent the wireless device 130 to attempt to access a cell, e.g., the cell 120, that may be barred to it, and therefore enables the wireless device 130 to save resources, such as energy resources, radio resources and processing resources.

Action 203

In this Action 203, the wireless device 130 may initiate accessing the cell 120 based on a result of the determination performed in Action 202.

The initiating may be understood herein as triggering, starting, facilitating or enabling.

Accessing the cell 120 may be performed, for example, via a radio link between the wireless device 130 and the network node 110 such as the first link 141.

Accessing the cell 120 may be understood as e.g., performing a random access procedure, or camping on the cell 120, that is, obtaining system information and listening for paging, but not necessarily establishing a connection unless the wireless device 130 has data or signalling to send and/or receive.

The advantage of initiating access to the cell 120 based on the result of the determination of Action 202 may be understood to be equivalent to those of performing Action 202.

Embodiments of a method, performed by the network node 110, will now be described with reference to the flowchart depicted in FIG. 4. The method may be understood to be for handling access to the cell 120 served by the network node 110. The network node 110 operates in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments.

The detailed description of some of the following corresponds to the same references provided above, in relation to the actions described for the user equipment 130, and will thus not be repeated here to simplify the description. For example, in some examples, the first feature may be Fifth Generation Core network (5GC) connectivity. The second feature may be Cell Specific Reference Signal (CRS) muting. In some particular examples, the first feature may be 5GC connectivity, and the second feature may be CRS muting.

Action 401

In this Action 401, the network node 110 broadcasts, to at least the wireless device 130 in the cell 120, the set of indications. The set of indications indicates that access to the cell 120 is allowed only to wireless devices simultaneously supporting at least two features of the plurality of features comprising the first feature and the second feature.

The sending, e.g., broadcasting, in this Action 301 may be performed via, e.g., the first link 141.

Particularly, the set of indications may enable the wireless device 130 to determine whether or not access to the cell 120 is barred to the wireless device 130.

In some embodiments, the first feature may be 5GC connectivity, and the second feature may be CRS muting.

In some embodiments, the set of indications may comprise at least one of: a) the first indication indicating whether or not access is barred explicitly to wireless devices supporting, simultaneously, at least the first feature and the second feature; b) the second indication indicating whether or not access is barred only explicitly to wireless devices lacking support to the first feature and the third indication indicating access is barred only explicitly to wireless devices lacking support to the second feature; and c) the two or more fourth indications explicitly indicating features enabled in the cell 120.

In some embodiments, such as in the first group of examples, the first indication may be the cellBarred-5GC-CRS flag.

In some embodiments, such as some examples in the first group of examples, the set of indications may further comprise: a) the fifth indication indicating that access is barred to all wireless devices except those supporting, the first feature or the second feature; b) the sixth indication indicating that access is barred to all wireless devices supporting the first feature, except those also supporting, simultaneously the second feature; and c) the seventh indication indicating that access is barred to all wireless devices supporting the second feature, except those also supporting, simultaneously the first feature.

In some particular embodiments, the set of indications may comprise the first indication indicating whether or not access is barred explicitly to wireless devices supporting, simultaneously, the first feature and the second feature, wherein the first feature is 5GC connectivity, and the second feature is CRS muting, wherein the first indication is a cellBarred-5GC-CRS flag, wherein the fifth indication is a cellBarred flag, wherein the sixth indication is a cellBarred-5GC flag, and wherein the seventh indication is a cellBarred-CRS flag.

In other particular embodiments, such as in the second group of examples, the second indication may be the cellBarred-non-5GC flag and the third indication may be the cellBarred-non-CRS flag.

The set of indications may, in some embodiments such as in some examples in the second group of examples, further comprise the fifth indication indicating that access is barred to all wireless devices except those supporting, the first feature or the second feature.

The two or more fourth indications may comprise, in some embodiments such as in the third group of examples: a) the PLMN ID in an EPC PLMN list indicating whether or not the first feature is enabled; and b) the nw-BasedCRS-InterferenceMitigation flag indicating whether or not the second feature is enabled.

By the network node 110 broadcasting the set of indications, the wireless device 130 is enabled to determine whether or not access to the cell 120 is barred to the wireless device 130. Particularly, the wireless device 130 may be enabled to determine if access to the cell 120 is allowed only to wireless devices simultaneously supporting at least two features of a plurality of features comprising the first feature and the second feature. This makes it possible to support a deployment option where a cell enables the at least two features simultaneously, and it may be desirable to bar access to wireless devices that do not support the at least two features simultaneously. This may prevent wireless devices to attempt to access a cell barred to them, and therefore enables them to save resources, such as energy resources, radio resources and processing resources. Likewise, the network node 110 avoids wasting energy resources, radio resources and processing resources in handling access attempts from wireless devices that are barred.

Action 402

In this Action 402, the network node 110 facilitates access to the cell 120 based on the broadcasted set of indications.

The facilitating may be understood herein as allowing, enabling, or performing the actions leading to. That is, the network node 110 may for example, enable or initiate an operation only for wireless devices simultaneously supporting the at least two features, e.g., LTE/5GC and CRS muting. The operation may be any of, for example, broadcasting other system information needed by the wireless device 130, such as paging and random access parameters, paging the wireless device 130 in case of network initiated data or signalling, responding to random access attempts initiated by the wireless device 130 in response to a paging message or new data and/or signalling, etc.

Certain embodiments disclosed herein may provide one or more of the following technical advantage(s), which may be summarized as that they provide for methods that make it possible to support a deployment option where a cell such as the cell 120 is only connected to 5GC and at the same time has CRS muting enabled.

Figure 5:
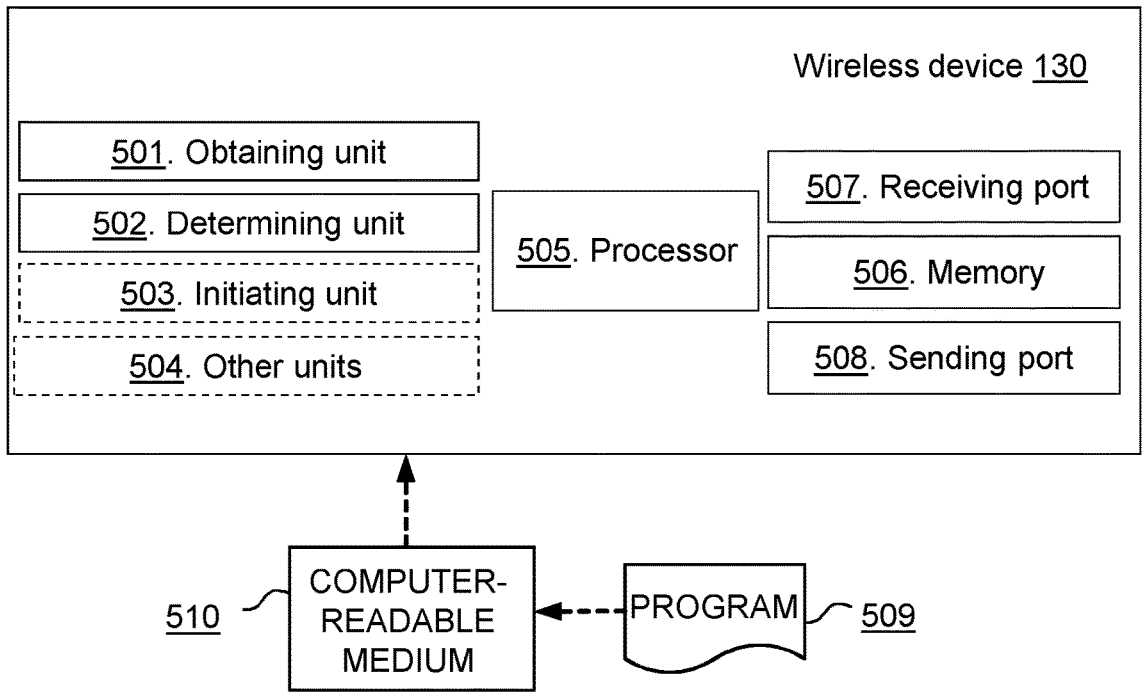
FIG. 5 is a schematic block diagram illustrating two non-limiting examples, a) and b), of a wireless device, according to embodiments herein.
Figure 5:
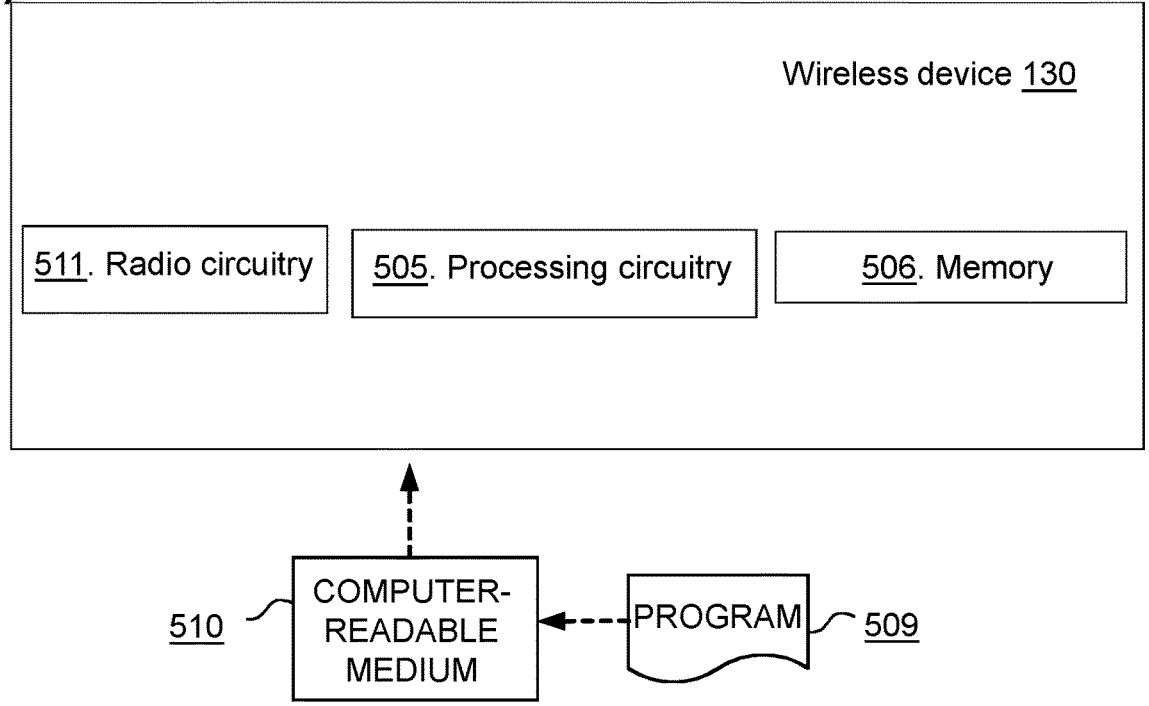

FIG. 5 depicts two different examples in panels a) and b), respectively, of the arrangement that the wireless device 130 may comprise to perform the method actions described above in relation to FIG. 2. In some embodiments, the wireless device 130 may comprise the following arrangement depicted in FIG. 5a.

The wireless device 130 may be understood to be for handling access to the cell 120 served by the network node 110. The wireless device 130 and the network node 110 are configured to operate in the wireless communications network 100.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. In FIG. 5, optional units are indicated with dashed boxes.

The detailed description of some of the following corresponds to the same references provided above, in relation to the actions described for the wireless device 130, and will thus not be repeated here. For example, in some examples, the first feature may be Fifth Generation Core network (5GC) connectivity. The second feature may be Cell Specific Reference Signal (CRS) muting. In some particular examples, the first feature may be 5GC connectivity, and the second feature may be CRS muting.

The wireless device 130 is configured to perform the obtaining of Action 201, e.g. by means of an obtaining unit 501 within the wireless device 130 configured to, obtain the set of indications broadcasted by the network node 110 in the cell 120. The set of indications are configured to indicate that access to the cell 120 is allowed only to wireless devices simultaneously supporting at least two features of the plurality of features comprising the first feature and the second feature. The obtaining unit 501 may be a processor 505 of the wireless device 130, or an application running on such processor.

The wireless device 130 may be configured to perform the determining of Action 202, e.g. by means of a determining unit 502 within the wireless device 130, configured to, determine whether or not access to the cell 120 is barred to the wireless device 130 based on the obtained set of indications. The determining unit 502 may be the processor 505 of the wireless device 130, or an application running on such processor.

In some embodiments, the first feature may be 5GC connectivity and the second feature may be CRS muting.

In some embodiments, the set of indications may be configured to comprise at least one of: a) the first indication configured to indicate whether or not access is barred explicitly to wireless devices supporting, simultaneously, at least the first feature and the second feature; b) the second indication configured to indicate whether or not access is barred only explicitly to wireless devices lacking support to the first feature and the third indication indicating access is barred only explicitly to wireless devices lacking support to the second feature; and c) two or more fourth indications configured to explicitly indicate features enabled in the cell 120.

In some embodiments, the first indication may be the cellBarred-5GC-CRS flag.

In some embodiments, the determining may be further configured to be based on: a) the fifth indication configured to indicate that access is barred to all wireless devices except those supporting, the first feature or the second feature; b) the sixth indication configured to indicate that access is barred to all wireless devices supporting the first feature, except those also supporting, simultaneously the second feature; and c) the seventh indication configured to indicate that access is barred to all wireless devices supporting the second feature, except those also supporting, simultaneously the first feature.

In some embodiments, the set of indications may comprise the first indication configured to indicate whether or not access is barred explicitly to wireless devices supporting, simultaneously, the first feature and the second feature, wherein the first feature is 5GC connectivity, and the second feature is CRS muting, wherein the first indication is the cellBarred-5GC-CRS flag, wherein the fifth indication is the cellBarred flag, wherein the sixth indication is the cellBarred-5GC flag, and wherein the seventh indication is the cellBarred-CRS flag.

In some embodiments, the second indication may be the cellBarred-non-5GC flag and the third indication may be the cellBarred-non-CRS flag.

In some embodiments, to determine may be further configured to be based on: the fifth indication configured to indicate that access is barred to all wireless devices except those supporting, the first feature or the second feature.

In some embodiments, the two or more fourth indications may be configured to comprise: a) the PLMN ID in the EPC PLMN list configured to indicate whether or not the first feature is enabled; and b) the nw-BasedCRS-/nterference-Mitigation flag configured to indicate whether or not the second feature is enabled.

In some embodiments, the wireless device 130 may be further configured to perform the initiating of Action 203, e.g., by means of an initiating unit 503 within the wireless device 130, configured to, initiate accessing the cell 120 based on the result of the determination. The initiating unit 503 may be the processor 505 of the wireless device 130, or an application running on such processor.

Other units 504 may be comprised in the wireless device 130.

The embodiments herein in the wireless device 130 may be implemented through one or more processors, such as a processor 505 in the wireless device 130 depicted in FIG. 5a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 506 comprising one or more memory units. The memory 506 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 507. In some embodiments, the receiving port 507 may be, for example, connected to one or more antennas in wireless device 130. In other embodiments, the wireless device 130 may receive information from another structure in the wireless communications network 100 through the receiving port 507. Since the receiving port 507 may be in communication with the processor 505, the receiving port 507 may then send the received information to the processor 505. The receiving port 507 may also be configured to receive other information.

The processor 505 in the wireless device 130 may be further configured to transmit or send information to e.g., the network node 110, another structure in the wireless communications network 100, through a sending port 508, which may be in communication with the processor 505, and the memory 506.

Those skilled in the art will also appreciate that the obtaining unit 501, the determining unit 502, the initiating unit 503, and the other units 504 described above may refer to a combination of analog and digital circuits, and/or one or more processors configured with software and/or firmware, e.g., stored in memory, that, when executed by the one or more processors such as the processor 505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 501-504 described above may be implemented as one or more applications running on one or more processors such as the processor 505.

Thus, the methods according to the embodiments described herein for the wireless device 130 may be respectively implemented by means of a computer program 509 product, comprising instructions, i.e., software code portions, which, when executed on at least one processor 505, cause the at least one processor 505 to carry out the actions described herein, as performed by the wireless device 130.

The computer program 509 product may be stored on a computer-readable storage medium 510. The computer-readable storage medium 510, having stored thereon the computer program 509, may comprise instructions which, when executed on at least one processor 505, cause the at least one processor 505 to carry out the actions described herein, as performed by the wireless device 130. In some embodiments, the computer-readable storage medium 510 may be a non-transitory computer-readable storage medium, such as a CD ROM disc, or a memory stick. In other embodiments, the computer program 509 product may be stored on a carrier containing the computer program 509 just described, wherein the carrier is one of an electronic signal, optical signal, radio signal, or the computer-readable storage medium 510, as described above.

The wireless device 130 may comprise a communication interface or an interface unit to facilitate communications between the wireless device 130 and other nodes or devices, e.g., the network node 110, the host computer 810, or any of the other nodes. In some particular examples, the interface may, for example, include a transceiver configured to transmit and receive radio signals over an air interface in accordance with a suitable standard.

In other embodiments, the wireless device 130 may comprise the following arrangement depicted in FIG. 5b. The wireless device 130 may comprise a processing circuitry 505, e.g., one or more processors such as the processor 505, in the wireless device 130 and the memory 506. The wireless device 130 may also comprise a radio circuitry 511, which may comprise e.g., the receiving port 507 and the sending port 508. The processing circuitry 505 may be configured to, or operable to, perform the method actions according to FIG. 2, and/or FIGS. 8-12, in a similar manner as that described in relation to FIG. 5a. The radio circuitry 511 may be configured to set up and maintain at least a wireless connection with the network node 110. Circuitry may be understood herein as a hardware component.

Hence, embodiments herein also relate to the wireless device 130 operative to operate in the wireless communications network 100. The wireless device 130 may comprise the processing circuitry 505 and the memory 506, said memory 506 containing instructions executable by said processing circuitry 505, whereby the wireless device 130 is further operative to perform the actions described herein in relation to the wireless device 130, e.g., in FIG. 2, and/or FIGS. 8-12.

Figure 8:
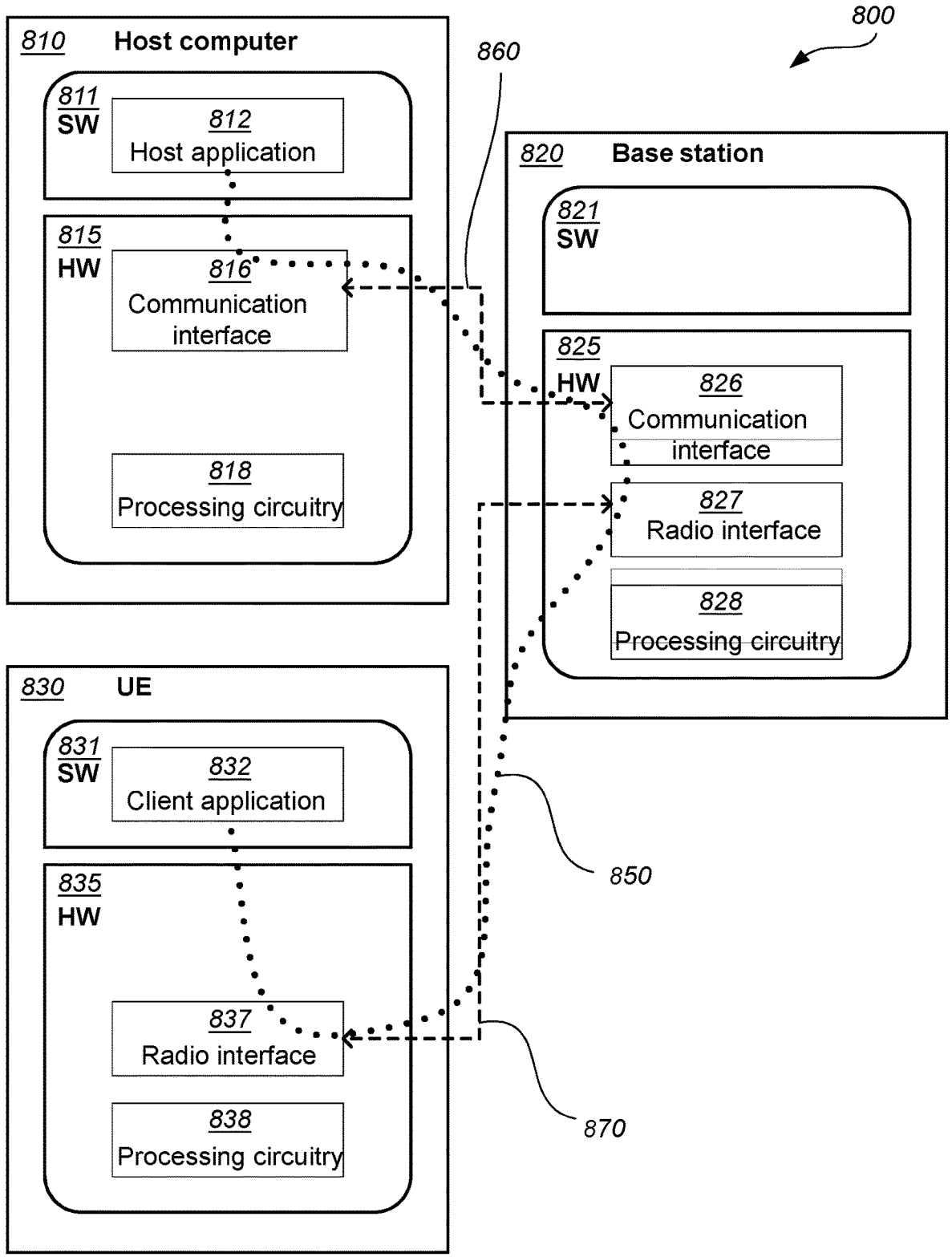
FIG. 8 is a generalized block diagram of a host computer communicating via a base station with a user equipment over a partially wireless connection, according to embodiments herein.

The wireless device 130 may comprise an arrangement as shown in FIG. 5 or in FIG. 8.

The wireless device 130 may also comprise a client application 832 or a client application unit, which may be configured to communicate user data with a host application unit in a host computer 810, e.g., via another link such as 850.

Figure 6:
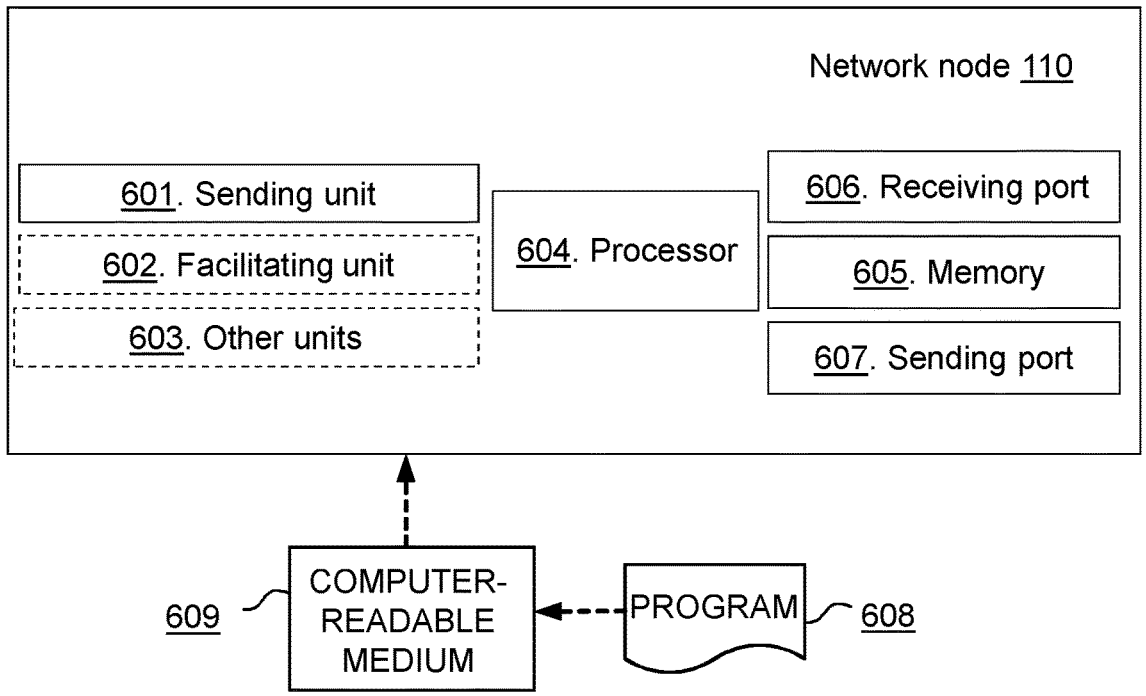
FIG. 6 is a schematic block diagram illustrating two non-limiting examples, a) and b), of a network node, according to embodiments herein.
Figure 6:
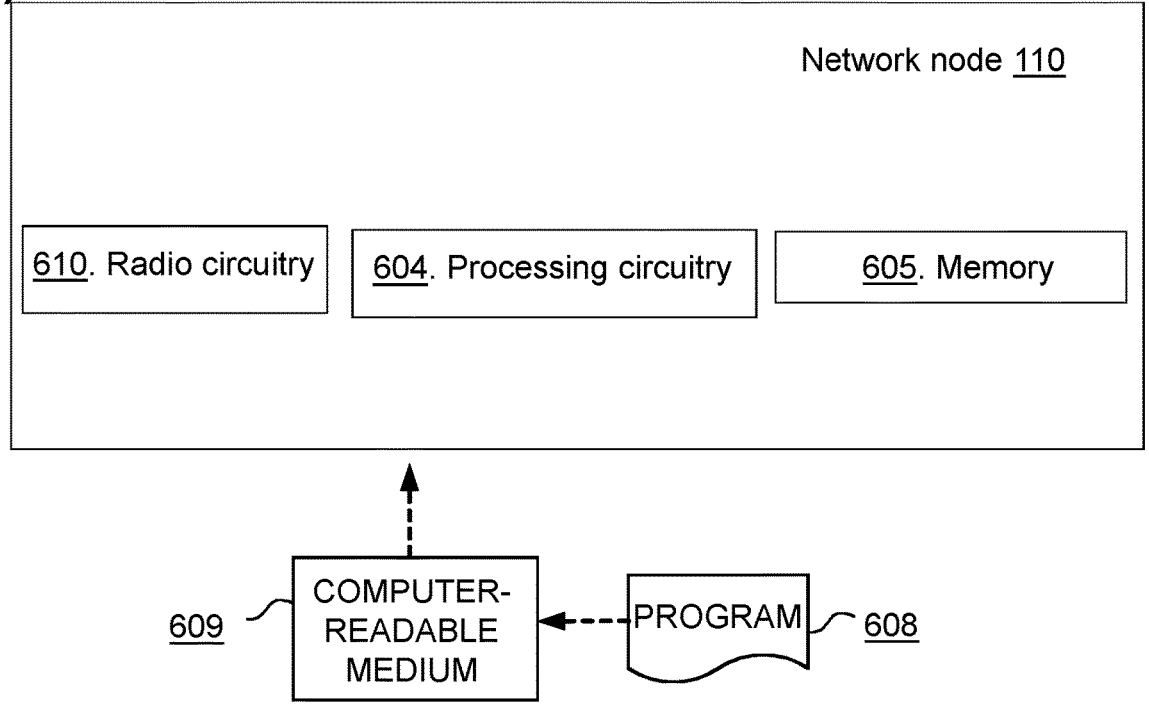

FIG. 6 depicts two different examples in panels a) and b), respectively, of the arrangement that the network node 110 may comprise to perform the method actions described above in relation to FIG. 4. In some embodiments, the network node 110 may comprise the following arrangement depicted in FIG. 6a.

The network node 110 may be understood to be for handling access, e.g., by the wireless device 130, to the cell 120 served by the network node 110. The network node 110 is configured to operate in the wireless communications network 100.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. In FIG. 6, optional units are indicated with dashed boxes. The detailed description of some of the following corresponds to the same references provided above, in relation to the actions described for the wireless device 130, and will thus not be repeated here. For example, in some examples, the first feature may be Fifth Generation Core network (5GC) connectivity. The second feature may be Cell Specific Reference Signal (CRS) muting. In some particular examples, the first feature may be 5GC connectivity, and the second feature may be CRS muting.

The network node 110 is configured to perform the sending of Action 401 action, e.g. by means of a sending unit 601 within the network node 110, configured to broadcast, to at least the wireless device 130 in the cell 120, the set of indications. The set of indications are configured to indicate that access to the cell 120 is allowed only to wireless devices simultaneously supporting the at least two features of the plurality of features comprising the first feature and the second feature. The sending unit 601 may be a processor 604 of the network node 110, or an application running on such processor.

The network node 110 is configured to perform the facilitating of Action 402, e.g., by means of a facilitating unit 602 within the network node 110, configured to facilitate access to the cell 120 based on the broadcasted set of indications. The facilitating unit 602 may be the processor 604 of the network node 110, or an application running on such processor.

In some embodiments, the first feature may be 5GC connectivity and the second feature may be CRS muting.

In some embodiments, the set of indications may be configured to comprise at least one of: a) the first indication configured to indicate whether or not access is barred explicitly to wireless devices supporting, simultaneously, at least the first feature and the second feature; b) the second indication configured to indicate whether or not access is barred only explicitly to wireless devices lacking support to the first feature and the third indication indicating access is barred only explicitly to wireless devices lacking support to the second feature; and c) two or more fourth indications configured to explicitly indicate features enabled in the cell 120.

In some embodiments, the first indication may be the cellBarred-5GC-CRS flag.

In some embodiments, the set of indications may be further configured to comprise: a) the fifth indication configured to indicate that access is barred to all wireless devices except those supporting, the first feature or the second feature; b) the sixth indication configured to indicate that access is barred to all wireless devices supporting the first feature, except those also supporting, simultaneously the second feature; and c) the seventh indication configured to indicate that access is barred to all wireless devices supporting the second feature, except those also supporting, simultaneously the first feature.

In some embodiments, the set of indications may comprise the first indication configured to indicate whether or not access is barred explicitly to wireless devices supporting, simultaneously, the first feature and the second feature, wherein the first feature is 5GC connectivity, and the second feature is CRS muting, wherein the first indication is the cellBarred-5GC-CRS flag, wherein the fifth indication is the cellBarred flag, wherein the sixth indication is the cellBarred-5GC flag, and wherein the seventh indication is the cellBarred-CRS flag.

In some embodiments, the second indication may be the cellBarred-non-5GC flag and the third indication may be the cellBarred-non-CRS flag.

In some embodiments, the set of indications may be further configured to comprise: the fifth indication configured to indicate that access is barred to all wireless devices except those supporting, the first feature or the second feature.

In some embodiments, the two or more fourth indications may be configured to comprise: a) the PLMN ID in the EPC PLMN list configured to indicate whether or not the first feature is enabled; and b) the nw-BasedCRS-Interference-Mitigation flag configured to indicate whether or not the second feature is enabled.

Other units 603 may be comprised in the network node 110.

The embodiments herein in the network node 110 may be implemented through one or more processors, such as a processor 604 in the network node 110 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 605 comprising one or more memory units. The memory 605 is arranged to be used to store obtained information, store data, configurations, schedulings, and applications etc. to perform the methods herein when being executed in the network node 110.

In some embodiments, the network node 110 may receive information from, e.g., the wireless device 130, through a receiving port 606. In some embodiments, the receiving port 606 may be, for example, connected to one or more antennas in network node 110. In other embodiments, the network node 110 may receive information from another structure in the wireless communications network 100 through the receiving port 606. Since the receiving port 606 may be in communication with the processor 604, the receiving port 606 may then send the received information to the processor 604. The receiving port 606 may also be configured to receive other information.

The processor 604 in the network node 110 may be further configured to transmit or send information to e.g., the wireless device 130, another structure in the wireless communications network 100, through a sending port 607, which may be in communication with the processor 604, and the memory 605.

Those skilled in the art will also appreciate that the sending unit 601, the facilitating unit 602, and the other units 603 described above may refer to a combination of analog and digital circuits, and/or one or more processors configured with software and/or firmware, e.g., stored in memory, that, when executed by the one or more processors such as the processor 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 601-603 described above may be implemented as one or more applications running on one or more processors such as the processor 604.

Thus, the methods according to the embodiments described herein for the network node 110 may be respectively implemented by means of a computer program 608 product, comprising instructions, i.e., software code portions, which, when executed on at least one processor 604, cause the at least one processor 604 to carry out the actions described herein, as performed by the network node 110. The computer program 608 product may be stored on a computer-readable storage medium 609. The computer-readable storage medium 609, having stored thereon the computer program 608, may comprise instructions which, when executed on at least one processor 604, cause the at least one processor 604 to carry out the actions described herein, as performed by the network node 110. In some embodiments, the computer-readable storage medium 609 may be a non-transitory computer-readable storage medium, such as a CD ROM disc, or a memory stick. In other embodiments, the computer program 608 product may be stored on a carrier containing the computer program 608 just described, wherein the carrier is one of an electronic signal, optical signal, radio signal, or the computer-readable storage medium 609, as described above.

The network node 110 may comprise a communication interface 826 configured to facilitate communications between the network node 110 and other nodes or devices, e.g., the wireless device 130. The communication interface 826 may be configured to communicate user data with a host application unit in a host computer 810, e.g., via another link such as 850. The interface may, for example, include a transceiver configured to transmit and receive radio signals over an air interface in accordance with a suitable standard.

In other embodiments, the network node 110 may comprise the following arrangement depicted in FIG. 6b. The network node 110 may comprise a processing circuitry 604, e.g., one or more processors such as the processor 604, in the network node 110 and the memory 605. The network node 110 may also comprise a radio circuitry 610, which may comprise e.g., the receiving port 606 and the sending port 607. The processing circuitry 604 may be configured to, or operable to, perform the method actions according to FIG. 4, and/or FIGS. 8-12, in a similar manner as that described in relation to FIG. 6a. The radio circuitry 610 may be configured to set up and maintain at least a wireless connection with the wireless device 130. Circuitry may be understood herein as a hardware component.

Hence, embodiments herein also relate to the network node 110 operative to operate in the wireless communications network 100. The network node 110 may comprise the processing circuitry 604 and the memory 605, said memory 605 containing instructions executable by said processing circuitry 604, whereby the network node 110 is further operative to perform the actions described herein in relation to the network node 110, e.g., in FIG. 4, and/or FIGS. 8-12.

The network node 110 may comprise an arrangement as shown in FIG. 6 or in FIG. 8. The network node 110 may comprise an interface unit to facilitate communications between the network node 110 and other nodes or devices, e.g., the wireless device 130, the host computer 810, or any of the other nodes. In some particular examples, the interface may, for example, include a transceiver configured to transmit and receive radio signals over an air interface in accordance with a suitable standard.

Examples Related to Embodiments Herein

Some examples related to embodiments herein will now be described. Several examples are comprised herein. It should be noted that the examples herein are not mutually exclusive. Components from one example may be tacitly assumed to be present in another example and it will be obvious to a person skilled in the art how those components may be used in the other exemplary examples. Furthermore, any of the examples related to embodiments herein may be combined with the features just described with combinations corresponding to those already described. For example, in some examples, the first feature may be Fifth Generation Core network (5GC) connectivity. The second feature may be Cell Specific Reference Signal (CRS) muting. In some particular examples, the first feature may be 5GC connectivity, and the second feature may be CRS muting.

The wireless device 130 examples relate to FIG. 2, FIG. 5, and FIGS. 8-12.

A method, performed by a wireless device, e.g., the wireless device 130, is described herein. The method may be understood to be for handling access to the cell 120 served by a network node, e.g., the network node 110. The wireless device 130 and the network node 110 operate in a wireless communications network, e.g., the wireless communications network 100. The method may comprise the following actions.

In some examples all the actions may be performed. In some examples, one or more actions may be performed. One or more examples may be combined, where applicable. All possible combinations are not described to simplify the description. In FIG. 2, optional actions are indicated with dashed lines. Some actions may be performed in a different order than that shown in FIG. 2.

Obtaining 201 a set of indications. The set of indications may be sent, e.g., broadcasted, by the network node 110 in the cell 120. The set of indications may indicate whether or not access to the cell 120 may be allowed to wireless devices simultaneously supporting at least two features of a plurality of features comprising a first feature and a second feature. The set of indications may indicate that access to the cell 120 is allowed only to wireless devices simultaneously supporting at least two features of a plurality of features comprising a first feature and a second feature. The wireless device 130 may be configured to perform this obtaining 201 action, e.g. by means of an obtaining unit 501 within the wireless device 130, configured to perform this action. The obtaining unit 501 may be a processor 505 of the wireless device 130, or an application running on such processor.

Determining 202 whether or not access to the cell 120 is barred to the wireless device 130 based on the obtained set of indications. The wireless device 130 may be configured to perform this initiating action 202, e.g. by means of a determining unit 502 within the wireless device 130, configured to perform this action. The determining unit 502 may be the processor 505 of the wireless device 130, or an application running on such processor.

Initiating 203 accessing the cell 120 based on a result of the determination in Action 202. The wireless device 130 may be configured to perform this initiating action 203, e.g., by means of an initiating unit 503 within the wireless device 130, configured to perform this action. The initiating unit 503 may be the processor 505 of the wireless device 130, or an application running on such processor.

The network node 110 examples relate to FIG. 4, FIG. 4*b* is, FIG. 6, and FIGS. 8-12.

A method, performed by a network node, e.g., the network node 110, is described herein. The method may be understood to be for handling access to the cell 120 served by the network node 110. The network node 110 operates in a wireless communications network, e.g., the wireless communications network 100. The method may comprise the following actions.

In some examples all the actions may be performed. In some examples, one or more actions may be performed. One or more examples may be combined, where applicable. All possible combinations are not described to simplify the description. In FIG. 4*b* is, optional actions are indicated with dashed lines.

Sending 301, e.g., broadcast, to at least the wireless device 130 in the cell 120, the set of indications. The set of indications may indicate whether or not access to the cell 120 may be allowed to wireless devices simultaneously supporting at least two features of the plurality of features comprising the first feature and the second feature. The set of indications may indicate that access to the cell 120 is allowed only to wireless devices simultaneously supporting at least the two features of the plurality of features comprising the first feature and the second feature. The indication may be explicit or implicit. The indication may be direct, or may be enabled to be derived or determined, from the set of indications. The network node 110 may be configured to perform this sending 301 action, e.g. by means of a sending unit 601 within the network node 110, configured to perform this action. The sending unit 601 may be a processor 604 of the network node 110, or an application running on such processor.

Facilitating 302 access to the cell 120 based on the sent, e.g., broadcasted, set of indication in Action 301. The network node 110 may be configured to perform this facilitating action 320, e.g., by means of a facilitating unit 602 within the network node 110, configured to perform this action. The facilitating unit 602 may be the processor 604 of the network node 110, or an application running on such processor.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

Further Extensions and Variations

Figure 7:
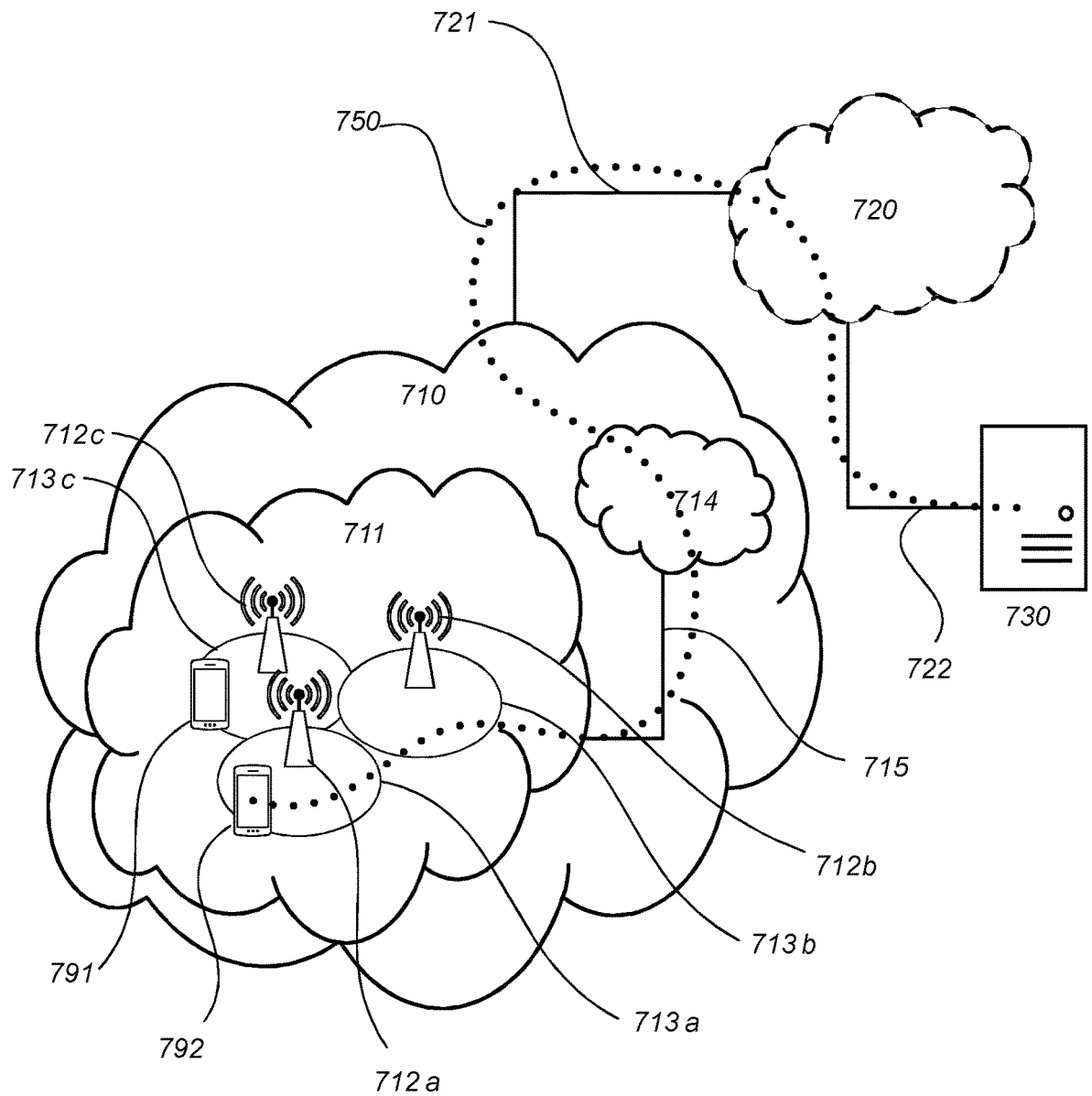
FIG. 7 is a schematic block diagram illustrating a telecommunication network connected via an intermediate network to a host computer, according to embodiments herein.

FIG. 7: Telecommunication network connected via an intermediate network to a host computer in accordance with some embodiments With reference to FIG. 7, in accordance with an embodiment, a communication system includes telecommunication network 710 such as the wireless communications network 100, for example, a 3GPP-type cellular network, which comprises access network 711, such as a radio access network, and core network 714. Access network 711 comprises a plurality of network nodes such as the network node 110. For example, base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A plurality of wireless devices, such as the wireless device 130 are comprised in the wireless communications network 100. In FIG. 7, a first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. Any of the UEs 791, 792 are examples of the wireless device 130.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signalling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

In relation to FIGS. 8, 9, 10, 11, and 12, which are described next, it may be understood that a UE is an example of the wireless device 130, and that any description provided for the UE equally applies to the wireless device 130. It may be also understood that the base station is an example of the network node 110, and that any description provided for the base station equally applies to the network node 110.

FIG. 8: Host computer communicating via a base station with a user equipment over a partially wireless connection in accordance with some embodiments Example implementations, in accordance with an embodiment, of the wireless device 130, e.g., a UE, the network node 110, e.g., a base station and host computer discussed in the preceding paragraphs will now be described with reference to FIG. 8. In communication system 800, such as the wireless communications network 100, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes the network node 110, exemplified in FIG. 8 as a base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with the wireless device 130, exemplified in FIG. 8 as a UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signalling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

FIG. 9: Methods implemented in a communication system including a host computer, a base station and a user equipment in accordance with some embodiments FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 10: Methods implemented in a communication system including a host computer, a base station and a user equipment in accordance with some embodiments FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

FIG. 11: Methods implemented in a communication system including a host computer, a base station and a user equipment in accordance with some embodiments FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12: Methods implemented in a communication system including a host computer, a base station and a user equipment in accordance with some embodiments FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.
5. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform one or more of the actions described herein as performed by the network node 110.
6. The communication system of embodiment 5, further including the base station.
7. The communication system of embodiment 6, further including the UE, wherein the UE is configured to communicate with the base station.
8. The communication system of embodiment 7, wherein:
    the processing circuitry of the host computer is configured to execute a host application, thereby providing the user data; and
    the UE comprises processing circuitry configured to execute a client application associated with the host application.
11. A method implemented in a base station, comprising one or more of the actions described herein as performed by the network node 110.
15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs one or more of the actions described herein as performed by the network node 110.
16. The method of embodiment 15, further comprising:
    at the base station, transmitting the user data.
17. The method of embodiment 16, wherein the user data is provided at the host computer by executing a host application, the method further comprising:
    at the UE, executing a client application associated with the host application.
21. A user equipment (UE) configured to communicate with a base station, the UE comprising a radio interface and processing circuitry configured to perform one or more of the actions described herein as performed by the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.
26. The communication system of embodiment 25, further including the UE.
27. The communication system of embodiment 26, wherein the cellular network further includes a base station configured to communicate with the UE.
28. The communication system of embodiment 26 or 27, wherein:
   the processing circuitry of the host computer is configured to execute a host application, thereby providing the user data; and
   the UE's processing circuitry is configured to execute a client application associated with the host application.
31. A method implemented in a user equipment (UE), comprising one or more of the actions described herein as performed by the wireless device 130.
35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the wireless device 130.
36. The method of embodiment 35, further comprising:
   at the UE, receiving the user data from the base station.
41. A user equipment (UE) configured to communicate with a base station, the UE comprising a radio interface and processing circuitry configured to perform one or more of the actions described herein as performed by the wireless device 130.
45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the wireless device 130.
46. The communication system of embodiment 45, further including the UE.
47. The communication system of embodiment 46, further including the base station, wherein the base station comprises a radio interface configured to communicate with the UE and a communication interface configured to forward to the host computer the user data carried by a transmission from the UE to the base station.
48. The communication system of embodiment 46 or 47, wherein:
   the processing circuitry of the host computer is configured to execute a host application; and
   the UE's processing circuitry is configured to execute a client application associated with the host application, thereby providing the user data.
49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.
51. A method implemented in a user equipment (UE), comprising one or more of the actions described herein as performed by the wireless device 130.
52. The method of embodiment 51, further comprising:
   providing user data; and
   forwarding the user data to a host computer via the transmission to the base station.
55. A method implemented in a communication system including a host computer, a base station and a user equipment (UE), the method comprising:
   at the host computer, receiving user data transmitted to the base station from the UE, wherein the UE performs one or more of the actions described herein as performed by the wireless device 130.
56. The method of embodiment 55, further comprising:
   at the UE, providing the user data to the base station.
57. The method of embodiment 56, further comprising:
   at the UE, executing a client application, thereby providing the user data to be transmitted; and
   at the host computer, executing a host application associated with the client application.
58. The method of embodiment 56, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
61. A base station configured to communicate with a user equipment (UE), the base station comprising a radio interface and processing circuitry configured to perform one or more of the actions described herein as performed by the network node 110.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.
66. The communication system of embodiment 65, further including the base station.
67. The communication system of embodiment 66, further including the UE, wherein the UE is configured to communicate with the base station.
68. The communication system of embodiment 67, wherein:
   the processing circuitry of the host computer is configured to execute a host application;
   the UE is configured to execute a client application associated with the host application, thereby providing the user data to be received by the host computer.
71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.

76. The method of embodiment 75, further comprising:
at the base station, receiving the user data from the UE.

77. The method of embodiment 76, further comprising:
at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | 3rd Generation Partnership Project |
| 5G | 5th Generation |
| DL | Downlink |
| eNB | E-UTRAN NodeB |
| E-UTRA | Evolved UTRA |
| E-UTRAN | Evolved UTRAN |
| GERAN | GSM EDGE Radio Access Network |
| gNB | Base station in NR |
| GSM | Global System for Mobile communication |
| HSPA | High Speed Packet Access |
| LTE | Long-Term Evolution |
| OFDM | Orthogonal Frequency Division Multiplexing |
| UE | User Equipment |
| UL | Uplink |
| UMTS | Universal Mobile Telecommunication System |
| UTRA | Universal Terrestrial Radio Access |
| UTRAN | Universal Terrestrial Radio Access Network |
| WCDMA | Wide CDMA |
| WLAN | Wide Local Area Network |
| BSR | Buffer Status Request |
| CC | Component Carrier |
| CCA | Clear Channel Assessment |
| CQI | Channel Quality Information |
| CRC | Cyclic Redundancy Check |
| DCI | Downlink Control Information |
| DL | Downlink |
| DMTC | DRS Measurement Timing Configuration |
| DRS | Discovery Reference Signal |
| eNB | evolved NodeB, base station |
| UE | User Equipment |
| UL | Uplink |
| LAA | Licensed-Assisted Access |
| SCell | Secondary Cell |
| STA | Station |
| LBT | Listen-before-talk |
| LTE-U | LTE in Unlicensed Spectrum |
| PDCCH | Physical Downlink Control Channel |
| PMI | Precoding Matrix Indicator |
| PUSCH | Physical Uplink Shared Channel |
| RAT | Radio Access Technology |
| RNTI | Radio Network Temporary Identifier |
| TXOP | Transmission Opportunity |
| UL | Uplink |

REFERENCES

3GPP TS 36.331, v15.1.0

The invention claimed is:

1. A method, performed by a wireless device, for handling access to a cell served by a network node, the wireless device and the network node operating in a wireless communications network, wherein the method comprises:
obtaining a set of indications broadcasted by the network node in the cell, the set of indications indicating that access to the cell is allowed only to wireless devices simultaneously supporting at least two features of a plurality of features comprising a first feature and a second feature; and
determining whether or not access to the cell is barred to the wireless device based on the obtained set of indications;
wherein the set of indications includes:
a first indication indicating whether or not access is barred explicitly to wireless devices supporting, simultaneously, at least the first feature and the second feature;
a second indication indicating whether or not access is barred only explicitly to wireless devices lacking support to the first feature and a third indication indicating access is barred only explicitly to wireless devices lacking support to the second feature;
two or more fourth indications explicitly indicating features enabled in the cell;
a fifth indication indicating that access is barred to all wireless devices except those supporting, the first feature or the second feature;
a sixth indication indicating that access is barred to all wireless devices supporting the first feature, except those also supporting, simultaneously, the second feature; and
a seventh indication indicating that access is barred to all wireless devices supporting the second feature, except those also supporting, simultaneously, the first feature.

2. The method of claim 1, wherein the first feature is Fifth Generation Core network (5GC) connectivity, and the second feature is Cell Specific Reference Signal (CRS) muting.

3. The method of claim 1, wherein the first indication is a cellBarred-5GC-CRS flag.

4. The method of claim 3,
wherein the first feature is 5GC connectivity, and the second feature is CRS muting,
wherein the fifth indication is a cellBarred flag,
wherein the sixth indication is a cellBarred-5GC flag,
and wherein the seventh indication is a cellBarred-CRS flag.

5. The method of claim 1, wherein the second indication is a cellBarred-non-5GC flag and the third indication is a cellBarred-non-CRS flag.

6. A method, performed by a network node, for handling access to a cell served by the network node, wherein the network node is operating in a wireless communications network, the method comprising:
broadcasting, to at least a wireless device in the cell, a set of indications, the set of indications indicating that access to the cell is allowed only to wireless devices simultaneously supporting at least two features of a plurality of features comprising a first feature and a second feature; and
facilitating access to the cell based on the broadcasted set of indications;
wherein the set of indications includes:
a first indication indicating whether or not access is barred explicitly to wireless devices supporting, simultaneously, at least the first feature and the second feature;
a second indication indicating whether or not access is barred only explicitly to wireless devices lacking support to the first feature and a third indication indicating access is barred only explicitly to wireless devices lacking support to the second feature;

two or more fourth indications explicitly indicating features enabled in the cell;

a fifth indication indicating that access is barred to all wireless devices except those supporting, the first feature or the second feature;

a sixth indication indicating that access is barred to all wireless devices supporting the first feature, except those also supporting, simultaneously, the second feature; and a seventh indication indicating that access is barred to all wireless devices supporting the second feature, except those also supporting, simultaneously, the first feature.

7. The method of claim 6, wherein the first feature is Fifth Generation Core network (5GC) connectivity, and the second feature is Cell Specific Reference Signal (CRS) muting.

8. The method of claim 6, wherein the first indication is a cellBarred-5GC-CRS flag.

9. The method of claim 8,
wherein the first feature is 5GC connectivity, and the second feature is CRS muting,
wherein the fifth indication is a cellBarred flag,
wherein the sixth indication is a cellBarred-5GC flag, and wherein the seventh indication is a cellBarred-CRS flag.

10. The method of claim 6, wherein the second indication is a cellBarred-non-5GC flag and the third indication is a cellBarred-non-CRS flag.

11. A wireless device for handling access to a cell served by a network node, the wireless device and the network node being configured to operate in a wireless communications network, the wireless device being configured to:
obtain a set of indications broadcasted by the network node in the cell, the set of indications being configured to indicate that access to the cell is allowed only to wireless devices simultaneously supporting at least two features of a plurality of features comprising a first feature and a second feature, and
determine whether or not access to the cell is barred to the wireless device based on the obtained set of indications;

wherein the set of indications includes:
a first indication indicating whether or not access is barred explicitly to wireless devices supporting, simultaneously, at least the first feature and the second feature;
a second indication indicating whether or not access is barred only explicitly to wireless devices lacking support to the first feature and a third indication indicating access is barred only explicitly to wireless devices lacking support to the second feature;
two or more fourth indications explicitly indicating features enabled in the cell;
a fifth indication indicating that access is barred to all wireless devices except those supporting, the first feature or the second feature;
a sixth indication indicating that access is barred to all wireless devices supporting the first feature, except those also supporting, simultaneously, the second feature; and
a seventh indication indicating that access is barred to all wireless devices supporting the second feature, except those also supporting, simultaneously, the first feature.

12. The wireless device of claim 11, wherein the first feature is Fifth Generation Core network (5GC) connectivity, and the second feature is Cell Specific Reference Signal (CRS) muting.

13. The wireless device of claim 11, wherein the first indication is a cellBarred-5GC-CRS flag.

14. The wireless device of claim 11, wherein the second indication is a cellBarred-non-5GC flag and the third indication is a cellBarred-non-CRS flag.

15. A network node, for handling access to a cell served by the network node, the network node being configured to operate in a wireless communications network, the network node being further configured to:
broadcast, to at least a wireless device in the cell, a set of indications, the set of indications being configured to indicate that access to the cell is allowed only to wireless devices simultaneously supporting at least two features of a plurality of features comprising a first feature and a second feature; and
facilitate access to the cell based on the broadcasted set of indications;

wherein the set of indications includes:
a first indication indicating whether or not access is barred explicitly to wireless devices supporting, simultaneously, at least the first feature and the second feature;
a second indication indicating whether or not access is barred only explicitly to wireless devices lacking support to the first feature and a third indication indicating access is barred only explicitly to wireless devices lacking support to the second feature;
two or more fourth indications explicitly indicating features enabled in the cell;
a fifth indication indicating that access is barred to all wireless devices except those supporting, the first feature or the second feature;
a sixth indication indicating that access is barred to all wireless devices supporting the first feature, except those also supporting, simultaneously, the second feature; and
a seventh indication indicating that access is barred to all wireless devices supporting the second feature, except those also supporting, simultaneously, the first feature.

16. The network node of claim 15, wherein the first feature is Fifth Generation Core network (5GC) connectivity, and the second feature is Cell Specific Reference Signal (CRS) muting.

17. The network node of claim 15, wherein the first indication is a cellBarred-5GC-CRS flag.

18. The network node of claim 15, wherein the second indication is a cellBarred-non-5GC flag and the third indication is a cellBarred-non-CRS flag.

* * * * *